Dec. 11, 1928.　　　　　　　　　　　　　　　　1,694,817
A. GUDMUNDSEN ET AL
BEET CLEANER
Filed June 26, 1926　　　　　2 Sheets-Sheet 1
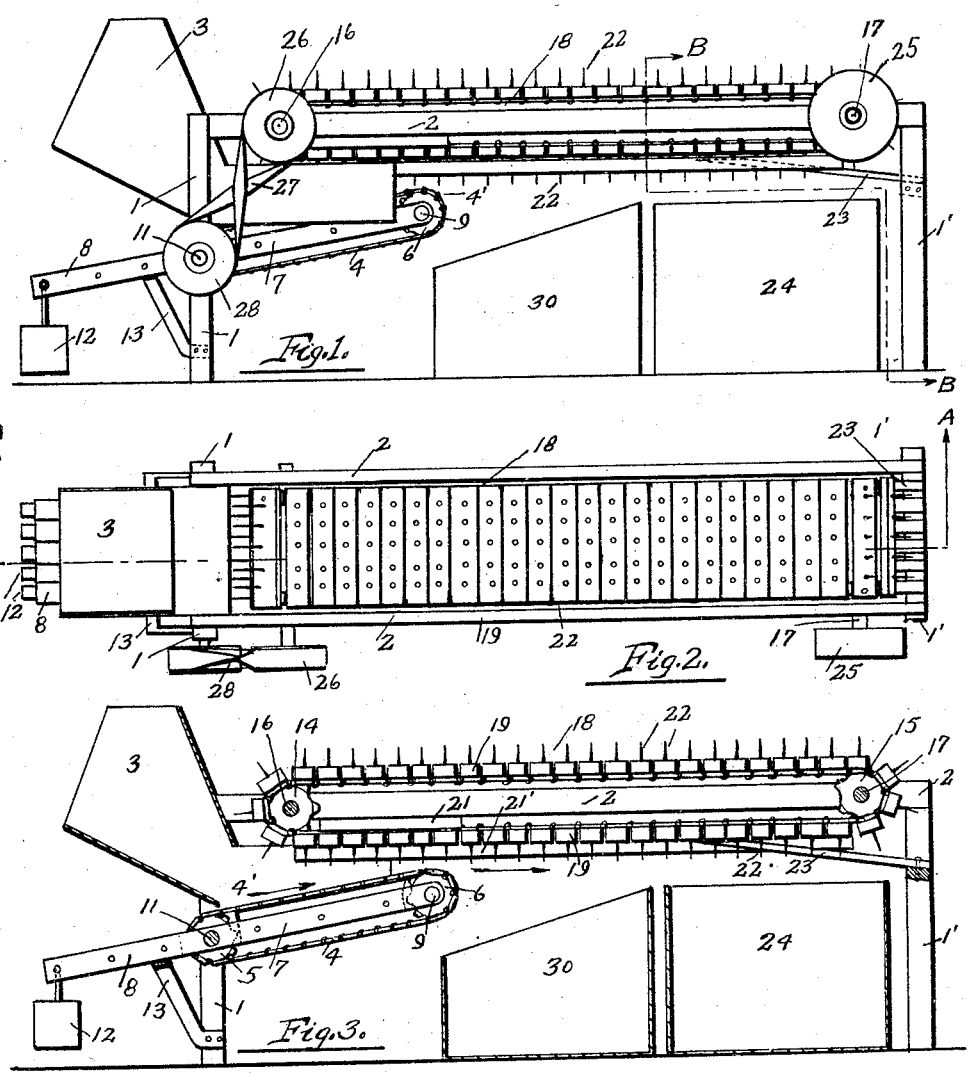
INVENTORS
Abraham Gudmundsen
Austin Gudmundsen Dec. 11, 1928.

A. GUDMUNDSEN ET AL 1,694,817

BEET CLEANER

Filed June 26, 1926

2 Sheets-Sheet 2

INVENTORS
Abraham Gudmundsen
Austin Gudmundsen

Patented Dec. 11, 1928.

1,694,817

UNITED STATES PATENT OFFICE.

ABRAHAM GUDMUNDSEN, OF AMERICAN FORK, AND AUSTIN GUDMUNDSEN, OF SALT LAKE CITY, UTAH.

BEET CLEANER.

Application filed June 26, 1926. Serial No. 118,670.

The invention pertains to machines for cleaning beets or other similar articles, and has for its object, to provide a novel contrivance whereby beets or the like may be separated from rocks, wood, tramp iron or other refuse.

Figure 4:
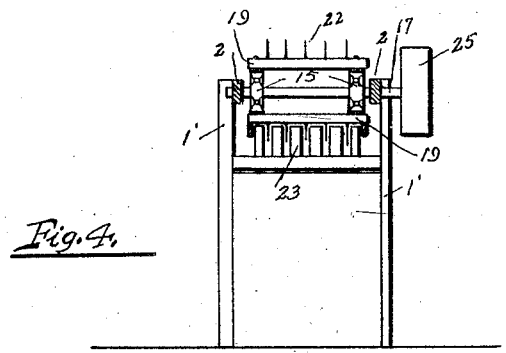
Figure 5:
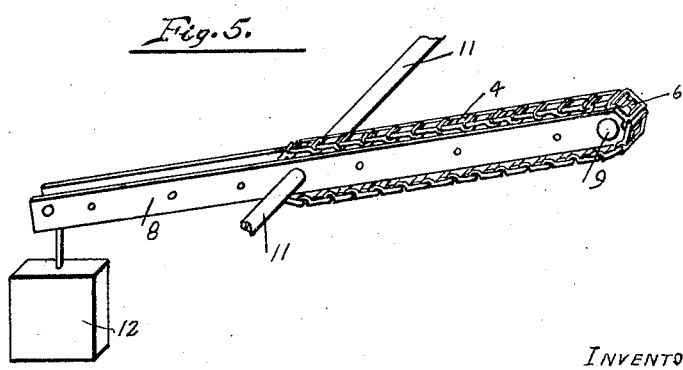

The invention is illustrated in the accompanying drawings, wherein:—Figure 1 is a side elevation of the apparatus. Figure 2 is a plan view. Figure 3 is a section through A—A of Figure 2. Figure 4 is a section through B—B of Figure 1. Figure 5 is an enlarged oblique view of one of the segments of the sectional conveyor.

In carrying out the invention there is provided a supporting frame including a pair of legs 1 at one end, a pair of legs 1' at the other end, and a pair of longitudinal beams 2. Attached to the forward end of the machine is a chute 3, having a sloping bottom. The chute discharges on to a sectional conveyor 4' comprising a plurality of endless chains 4 which are trained around a plurality of spaced apart sprockets 5 and 6. Plates 7, which are hinged on shaft 11 to which sprockets 5 are secured, extend both forwardly and rearwardly from shaft 11, the rearward portions of each pair of plates being secured together to form rigid arms 8 and the forward pairs being drilled at the forward ends to receive short shafts 9 on which are journaled sprocket 6. Weights 12 are secured to arms 8 and the downward movement of said arms 8 is restricted by banking rod 13 which is secured to legs 1.

Disposed between the beams 2 are the sprockets 14 and 15, the shafts 16 and 17 of which are journaled through the beams 2. An endless slat conveyor 18 is trained around the sprockets 14 and 15 and the ends of the slats 19 comprising the lower run of the slat conveyor are guided between ways provided between the longitudinal strips 21 and 21' which are secured to beams 2. Slats 19 comprising the conveyor carry projecting pins or spikes 22 which are rigidly secured thereto.

Disposed between rows of spikes 22 are rods or fingers 23 which are at an angle with the lower run of the slat conveyor. These rods act as strippers which detach impaled objects from the spikes, allowing them to drop into hopper 24. Conveyor 18 is power driven through any suitable train or mechanism, a belt pulley 25 attached to shaft 17 being here shown. On the end of shaft 16 is provided a pulley 26 which is connected through a crossed belt 27 to the pulley 28 which is secured to shaft 11. It can readily be seen from this arrangement that the slat conveyor 18 and the sectional conveyor 4' will be driven so that the lower run of the former and the upper run of the latter will travel in the same direction, as indicated by the arrows.

In operation, sugar beets are fed into chute 3 where they slide down on to the sectional conveyor 4'. The top surface of the sectional conveyor 4' converges toward the lower run of the slat conveyor 18, and as both conveyors are traveling in directions indicated by the arrows, the beets are drawn along by conveyor 4' and are pressed into the spikes 22. After passing the sprockets 6, the beets, being held on the spikes 22, are carried to the stripper rods 23 and due to the wedging-off action of these inclined rods, the beets are stripped off the spikes, and fall into the chute or hopper 24. When a rock or other hard object is encountered by the spikes 22, the segments 4, of sectional conveyor 4', immediately under the object will yield downwardly against the action of the weights 12 which are attached to the ends of arms 8. When the object has passed over the end of the sectional conveyor 4', the weights 12 will drop down, thus bringing the conveyor segments into normal position again. The hard object, not being impaled on the spikes 22, will fall down into the trash hopper 30.

It is thus possible with this machine to make a clean separation of beets from trash, thus enabling the beets to be delivered to the cutting machine free from any refuse that might dull, break or clog the cutters.

While the present contrivance is particularly adapted to the above use, it may be used for cleaning or separating other articles as well. It is also understood that changes in the precise embodiment of the invention herein disclosed, can be made without departing from the spirit of the invention.

We claim:

1. A separator comprising a longitudinally sectionalized yieldable member the sections of which are yieldable independently of each other, a conveyor disposed above the yieldable member, pins projectable beyond the same to enter objects traveling along the yieldable member and to carry the objects therewith, fingers located adjacent to the underside of the conveyor between rows of pins adapted to release the objects carried on the pins.

2. A separator comprising a sectionalized yieldable member consisting of a plurality of comparatively thin longitudinal chains placed side by side each being yieldable downwardly, an endless member disposed above the yieldable member with pins, secured to the same and projectable beyond it, and a plurality of rods or fingers so disposed between rows of pins as to constitute means whereby the objects will be released from the pins.

3. A separator comprising a plurality of longitudinal chain trains arranged side by side each being capable of yielding downward independently of adjacent trains, the combination securing a segmentally yieldable traveling platform, a slat conveyor mounted above the yieldable platform, pins secured to the slats and projectable beyond the same, and a plurality of rods, longitudinally disposed adjacent to the lower run of the slat conveyor and between rows of pins.

4. A separator comprising a yieldable traveling platform consisting of a plurality of comparatively thin longitudinal weight controlled conveyors arranged adjacent to one another, each conveyor being hinged and having a weighted arm disposed rearwardly from the hinge for yieldably holding the conveyor up in its normal position, a single relatively wide slat conveyor member disposed above the traveling platform, and having pins rigidly secured thereto and projectable beyond the slats, tracks disposed adjacent to the ends of the slats on the lower run of the conveyor adapted to guide and support the same, and rods disposed adjacent to the lower run of the conveyor between rows of pins.

In testimony that we claim the foregoing as our own we have hereto affixed our signatures.

ABRAHAM GUDMUNDSEN.
AUSTIN GUDMUNDSEN.